United States Patent
Tynderfeldt et al.

(10) Patent No.: US 7,436,901 B2
(45) Date of Patent: Oct. 14, 2008

(54) SELECTION OF CHANNEL CODING AND MULTIDIMENSIONAL INTERLEAVING SCHEMES FOR IMPROVED PERFORMANCE

(75) Inventors: Tobias Tynderfeldt, Soina (SE); Mikael Hook, Sollenluna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 585 days.

(21) Appl. No.: 11/108,903

(22) Filed: Apr. 19, 2005

(65) Prior Publication Data

US 2006/0233280 A1 Oct. 19, 2006

(51) Int. Cl.
*H04L 27/00* (2006.01)

(52) U.S. Cl. .................................. 375/299; 375/267

(58) Field of Classification Search ............. 375/260, 375/267, 261, 285, 295, 299, 346, 347, 349; 370/334, 342; 455/101, 103
See application file for complete search history.

(56) References Cited

U.S. PATENT DOCUMENTS

| | | | |
|---|---|---|---|
| 6,097,771 A | 8/2000 | Foschini | |
| 6,317,466 B1 | 11/2001 | Foschini et al. | |
| 7,126,996 B2 * | 10/2006 | Classon et al. | 375/260 |
| 2001/0050964 A1 | 12/2001 | Foschini et al. | |
| 2002/0085643 A1 * | 7/2002 | Kitchener et al. | 375/267 |
| 2002/0142723 A1 | 10/2002 | Foschini et al. | |
| 2003/0086371 A1 * | 5/2003 | Walton et al. | 370/235 |
| 2003/0161412 A1 * | 8/2003 | Niida et al. | 375/299 |
| 2003/0231706 A1 * | 12/2003 | Hwang | 375/219 |
| 2004/0027994 A1 | 2/2004 | Baines | |

FOREIGN PATENT DOCUMENTS

| | | |
|---|---|---|
| EP | 1392017 | 2/2004 |
| WO | 02/091657 | 11/2002 |
| WO | 03/073646 | 9/2003 |
| WO | 2004/032401 | 4/2004 |

OTHER PUBLICATIONS

International Search Report and Written Opinion for International Application No. PCT/SE2006/050039 dated Sep. 20, 2006.
Catreau et al., "Adaptive Modulation and MIMO Coding for Broadband Wireless Data Networks", IEEE Communications Magazine, Jun. 2002, pp. 108-115.
Yang, "A Road to Future Broadband Wireless Access: MIMO-OFDM-Based Air Interface", IEEE Communications Magazine, Jan. 2005, pp. 53-60.
Sampath et al., A Fourth-Generation MIMO-OFDM Broadband Wireless System: Design Performance, and Field Trial Results:, IEEE Communications Magazine, Sep. 2002, pp. 143-149.

(Continued)

*Primary Examiner*—Khanh C Tran
(74) *Attorney, Agent, or Firm*—Nixon & Vanderhye P.C.

(57) ABSTRACT

One or more radio characteristics are considered to determine selection of one or more of the following: interleaving scheme, channel coding scheme, modulation scheme, and/or transmission scheme. Accounting for these factors and interdependencies improves performance in a mobile radio communications system. One example performance measure is throughput over the radio interface.

44 Claims, 8 Drawing Sheets

OTHER PUBLICATIONS

Tynderfeldt et al., "Transmit Diversity Options for GSM/EDGE", 2004 IEEE, pp. 490-494.

U. Wachsmann, J. Thielecke, and H. Schotten; "Exploiting the Data-Rate Potential of MIMO Channels: Multi-Stratum Space-Time Coding;" Ericsson Eurolab Deutschland GmbH, Nürnberg, Germany, Spring 2001.

K. Kim, Y. Kim, and J. Ahn; "An Adaptive MIMO Transmission Technique for LDPC Coded OFDM Cellular Systems;" Electronics and Telecommunications Research Institute; Korea, Spring 2004.

Haberland; "3G Evolution Towards High Speed Downlink Packet Access;" Alcatel Telecommunications Review-4th Quarter 2003/1st Quarter 2004; pp. 1-10.

Gesbert et al.; "From Theory to Practice: An Overview of MIMO Space-Time Coded Wireless System;" IEEE Journal on Selected Areas in Communications; vol. 21, No. 3; Apr. 2003; pp. 281-302.

P. W. Wolniansky, G. J. Foschini, G. D. Golden, and R. A. Valenzuela; "V-BLAST: An Architecture for Realizing Very High Data Rates Over the Rich-Scattering Wireless Channel;" Bell Laboratories, Lucent Technologies, Crawford Hill Laboratory; Holmdel, New Jersey, Sep. 1998.

"BLAST: Bell Labs Layered Space-Time" An Architecture for Realizing Very High Data Rates over Fading Wireless Channels; http://www1.bell-labs.com/project/blast/high-level-overview.html. , 2005.

"MIMO/Space-Time Coding Systems;" Mitsubishi Electric Research Laboratories. , Jul. 2003.

"Bezout Equalizer for MIMO Systems;" Mitsubishi Electric Research Laboratories. , Jul. 2003.

"MIMO Communications and Signal Processing;" Apr. 2002; http://www.ph.tn.tudelft.nl/PRInfo/journals/msg00258.html.

"MIMO Channels and Space-Time Coding Lectures;" http://www.ee.ualberta.ca/~schlegal/Lectures.html. , Jul. 2003.

\* cited by examiner

Fig. 6 a)

| | I-1 | I-2 | I-3 |
|---|---|---|---|
| MCS-1 | X | X | X |
| MCS-2 | X | X | X |
| MCS-3 | X | X | X |
| MCS-4 | X | X | X |
| MCS-5 | X | X | X |
| MCS-6 | X | X | X |
| MCS-7 | X | X | X |
| MCS-8 | X | X | X |
| MCS-9 | X | X | X | b)

| | I-1 | I-2 | I-3 |
|---|---|---|---|
| MCS-1 | X | X | |
| MCS-2 | X | X | |
| MCS-3 | | X | |
| MCS-4 | | | X |
| MCS-5 | X | X | |
| MCS-6 | X | X | |
| MCS-7 | X | X | X |
| MCS-8 | | X | X |
| MCS-9 | | X | X | c)

| | I-1 | I-2 | I-3 |
|---|---|---|---|
| MCS-1 | X | | |
| MCS-2 | X | | |
| MCS-3 | | X | |
| MCS-4 | | | X |
| MCS-5 | X | | |
| MCS-6 | X | | |
| MCS-7 | | X | |
| MCS-8 | | | X |
| MCS-9 | | | X |

I: Interleaving scheme
X: Allowed MCS - Interleaving scheme combination

SELECTION OF CHANNEL CODING AND MULTIDIMENSIONAL INTERLEAVING SCHEMES FOR IMPROVED PERFORMANCE

TECHNICAL FIELD

The technical field relates to radio communications systems, and more particularly, to multi-channel communication systems.

BACKGROUND

There is interest in wireless communication systems transmitting signals over a Multiple-Input Multiple-Output (MIMO) channel. In a MIMO transmission scheme, signals are transmitted simultaneously from multiple transmit antennas at the transmitter. Multiple receive antennas in the receiver are used to detect all the transmitted signals. The data stream is divided into multiple sub-streams or layers of data. Each data layer is transmitted independently of the other layers. The aim of MIMO transmission schemes is to offer increased bit rates by transmitting multiple layers of data in parallel.

Different MIMO transmission schemes include a layered space-time architecture for multi-element antenna arrays often named BLAST (Bell-Labs Layered Space-Time architecture), designed for systems with flat fading channels. The BLAST method can be divided into two sub-classes: Diagonal BLAST (D-BLAST) and Vertical BLAST (V-BLAST). In the BLAST MIMO schemes, a stream of data is de-multiplexed into several sub-streams or layers of data, each of which is encoded with an error correcting channel code and interleaved independently of the other layers. These kinds of MIMO schemes, where each layer is encoded separately, are referred to for convenience as "per-layer coding."

FIG. 1 illustrates a transmitter 10 using a per-layer coding MIMO scheme in which a stream of data packets is received in a demultiplexer 12 and de-multiplexed into sub-layers (four are shown for illustration). Each sub-layer is channel encoded using a selected coding rate in a corresponding channel encoders 14. The coded bits are then mapped in block 16 to particular transmission branches that each include a modulator 18 and an antenna 20. In FIG. 1, the demultiplexing into layers occurs prior to the channel encoder. Another example of a per-layer coding MIMO scheme is a PARC (Per Antenna Rate Control) scheme. The per-layer coding MIMO schemes transmit multiple code blocks in parallel. The interleaving dimension is fixed (e.g. time), and does not depend on the radio conditions.

An alternative approach to per-layer coding MIMO transmission performs the channel coding prior to de-multiplexing onto different layers. This approach is referred to for convenience as "all-layer coding" and is illustrated in FIG. 2. The transmitter 10 in FIG. 2 directs the data stream to the channel encoder 14 which channel encodes the data stream. The coded data stream is demultiplexed into separate coded layers in demultiplexer 12. The remaining operations in the layer processing branches are similar to those described in FIG. 1. For these kinds of MIMO schemes, a fixed interleaving scheme is used, where the encoded data block is interleaved over all antennas, and where only one code block is transmitted at a time. Fixed interleaving does not take radio conditions into account.

In a MIMO receiver, several different algorithms may be used to detect the signals transmitted from the multiple transmit antennas. Detection involves both demodulation and decoding. One example is a multi-staged detection of the transmitted layers. A multi-stage detector in a MIMO receiver 22 is shown in FIG. 3. A suppressor 24 suppresses all layers except one. That one layer is demodulated in demodulator 26 and then decoded in a decoder 28 while the other remaining layers are suppressed. After a layer has been detected (demodulated and decoded), it is cancelled, i.e., subtracted, before the detection of another layer. In the last detection stage, all except one layer has been cancelled in a preceding detection stage. The cancellation of a detected layer improves the detection of the remaining layers. In order to reduce the complexity and processing delay, the receiver may cancel a detected layer directly after the demodulation. In that case, the decoding is done after the cancellation. This approach is particularly useful in a mobile radio communications system such as GSM/EDGE where channel coding is interleaved over several bursts.

In modern wireless networks, e.g., GSM through EGPRS, WCDMA through WCDMA Evolved and cdma2000 through 1XEV, etc., Link Adaptation (LA) is used to adapt the channel coding rate, and possibly also the modulation scheme, to the radio environment. When the channel quality is good, it is possible to transmit more information over the channel then when the channel quality is poor. Evaluating signal quality could, for example, be based on average Signal-to-Noise-Ratio (SNR).

In EGPRS, there are nine Modulation and Coding Schemes (MCS) defined, with code rates of the error correcting channel codes ranging from 0.37 (for MCS-5) to 1.0 (for MCS-4 and MCS-9). Two different modulations are also used: Gaussian Minimum Shift Keying (GMSK) and 8-ary Phase Shift Keying (8-PSK). MCS-1 to MCS-4 use GMSK, and MCS-5 to MCS-9 use 8-PSK modulated signals. Different MCS's are used depending on the detected SNR. For a high SNR, the higher order modulation, 8-PSK, and a high code rate may be used.

GSM is a TDMA (Time Division Multiple Access) based system. In EGPRS, information bits are divided into RLC (Radio Link Control) blocks. Radio blocks are then formed from one or two RLC blocks, and each radio block is transmitted over four bursts (data units). The channel can vary quite significantly between different bursts. Although this variation is beneficial for MCS's with a low code rate, it is usually detrimental for MCS's with a high code rate. The reason for this is that for low rate codes, i.e., a large amount of redundancy, channel variations improve decoder performance. For high rate codes, i.e., a small amount of redundancy, channel variations degrades the decoder performance. To reduce the channel variations for MCS-8 and MCS-9, the radio block is divided into two blocks, where each block includes two consecutive data unit bursts.

For a MIMO transmission scheme to work efficiently, it should be combined with link adaptation (LA). Consider the simplistic examples shown in FIG. 4. A base station (BS) serves a cell area that includes in this example three mobile radio stations (MS1-MS3). The mobile station MS1 is very close to the base station and enjoys excellent radio channel conditions and thus may only need a high coding rate (small amount of redundancy in the channel code) or no coding at all. In contrast, the mobile station MS2 is much farther away near the edge of the cell area and experiences poor radio channel conditions requiring more channel coding, i.e., a lower coding rate. Radio channel conditions also change rapidly depending on interference from other transmissions, fading, and obstacles. The latter factor is represented as a building blocking the direct radio path between mobile station MS3 and the base station. Link adaptation may be extended to include combinations of modulation and channel coding. If channel quality is high, a higher order modulation can be used together with an appropriate amount of channel coding.

One approach to combining MIMO and link adaptation is to select one fixed MIMO scheme while the MCS is varied depending on the radio environment. But a single MIMO scheme is not always best-suited for all radio environments. A better approach is to also select a MIMO scheme based on radio channel conditions. An additional problem is that one MIMO scheme may not be best for each of multiple coding or MCS schemes.

A further problem with adaptation between different MCS's for a fixed MIMO transmission scheme is error propagation in the receiver. For example, the receiver algorithms using a multi-staged detection of the MIMO layers (see FIG. 3) suffer to a greater or lesser degree from propagation of errors from one detected layer to the subsequently detected layers. For low code rate MCS's, this may not be a very large problem since the error correcting channel code can be used to correct a large portion of these errors. But for the high code rate MCS's, an error in one layer is much more likely to cause errors also in the other layers.

Another important factor in the performance of a transmission scheme is the interleaving or diversity scheme used to allocate data units from a data block to one or more antennas. Examples of interleaving schemes include allocating data units from a data block to different antennas (space diversity), allocating data units to different time slots transmitted from the same antenna (time diversity), and allocating data units to different frequencies transmitted from the same or multiple antennas (frequency diversity). For example, an interleaving scheme that maximizes the diversity (variations in the channel quality) within a coding block, usually improves performance for low code rate MCS's, but often degrades performance for high code rate MCS's, and vice versa. In other words, the diversity resulting from transmitting data units at different times over a time-varying channel can be advantageous or disadvantageous depending on the code rate of the channel code.

For example, in EGPRS, MCS-4, MCS-8 and MCS-9 permit transmission at very high code rates (very little coding protection). So poor channel quality for one data transmission burst is very likely to result in one or more errors in that burst after channel decoding in the receiver notwithstanding a situation where the other bursts are decoded without any detected errors. The poor quality might be the result of a fading dip for the channel, interference from another user in the system, or from high correlation between the received signals for that particular channel realization. The other lower code rate MCS's, however, benefit from large variations in signal quality between the bursts due to a potentially higher average quality of the received code block (RLC block). It is therefore difficult to find one interleaving scheme suitable for multiple MCS's with high and low code rates Like these time domain variations across different TTIs, quality variations can also be found across different transmit antennas. The correlation of the channels between transmit and receive antennas affects the signal quality in the space or antenna domain. While the quality variation or diversity in the time domain depends on Doppler, frequency hopping, interference, etc., the diversity in the space or antenna domain depends on antenna placement, the radio signal propagation environment, and the receiver architecture. Simply having one the interleaving or diversity scheme or selecting one particular interleaving scheme without regard to the channel coding scheme and the radio channel conditions leads to poor performance and even unacceptable error rates.

SUMMARY

The inventors recognized that various radio characteristics as well as coding scheme selection impact which interleaving scheme, modulation scheme, and/or transmission scheme should be selected. They devised an approach which accounts for these various factors and interdependencies in order to improve performance. One example performance measure is throughput over the radio interface.

Consider a radio communications system where blocks of data are communicated over a radio interface using multiple antennas. Each antenna is associated with at least one corresponding radio channel and each data block including multiple data units. One or more characteristics of the radio channels associated with the multiple antennas and one or more diversity conditions of the radio channels are determined. The one or more diversity conditions include one or more of time diversity, space diversity, or frequency diversity of or between the radio channels. Diversity is the degree to which signals transmitted during two time intervals, over two antennas, or on two frequencies correlate or match with each other. The diversity condition may include one or more of: a time diversity that would be obtained by interleaving the data units over time, a space diversity that would be obtained by interleaving the data units across the multiple antennas, and a frequency diversity that would be obtained by interleaving the data units over frequency.

Based on the determined one or more radio characteristics, one of plural channel coding schemes to code a data block is selected to code the data block. Given the selected coding scheme and the determined one or more diversity conditions, one of plural multi-dimensional interleaving schemes is selected to allocate data units from the coded block over one or more of the multiple transmit antennas using the selected multi-dimensional interleaving scheme. The channel coding scheme and interleaving scheme are selected to optimize a performance of the data block transmission for the determined one or more radio channel characteristics and the one or more diversity conditions. In one example implementation, the selection of channel coding scheme and multi-dimensional interleaving is made jointly based on the radio channel characteristics to optimize the performance of the data block transmission. Joint selection means that the selection of one scheme takes the selection of one or more other schemes into account.

Based on the determined one or more radio characteristics, one of plural transmission schemes may also be selected if desired and if there are multiple transmission schemes to select from. The selection of transmission scheme also depends on the selected channel coding scheme and the determined one or more radio channel characteristics. In one example, the one or more transmission schemes includes a multiple input multiple output (MIMO) transmission scheme. Similarly, one of plural modulation schemes for modulating the data stream may also be selected (if desired) based on the determined one or more radio channel characteristics and the selected coding scheme.

In one example embodiment, a memory with a lookup table stores a mapping between one of the channel coding schemes and one of the multi-dimensional interleaving schemes associated with a particular radio characteristic or set of radio characteristics. The determined one or more radio channel characteristics is used to access from the lookup table the associated channel coding scheme and multi-dimensional interleaving scheme.

Consider the following example scenarios. For a higher quality radio channel characteristic, a higher rate channel coding, and a stronger correlation (lower space diversity) between radio channels across the multiple antennas, a multi-dimensional interleaving scheme that interleaves the data units for one block over the multiple antennas for space-diversity transmission may be selected. For a higher quality radio channel characteristic, higher rate channel coding, and stronger correlation (lower time diversity) between radio channels over time, a multi-dimensional interleaving scheme that interleaves data units for a first block over one of the multiple antennas for time-diversity transmission for the first block and data units for a second block over another of the multiple antennas for time-diversity transmission for the second block may be selected.

For a lower quality radio channel characteristic, lower rate channel coding, and stronger correlation (lower space diversity) between radio channels across the multiple antennas, a multi-dimensional interleaving scheme that interleaves for a first block over one of the multiple antennas for time-diversity transmission for the first block and data units for a second block over another of the multiple antennas for time-diversity transmission for the second block may be selected. For a lower quality radio channel characteristic, lower rate channel coding, and stronger correlation (lower time diversity) between radio channels over time, a multi-dimensional interleaving scheme that interleaves the data units for one block over the multiple antennas for space-diversity transmission may be selected.

Example radio characteristics include one or more of the following: a channel quality parameter, a measure of time variance of each radio channel, a measure of correlation between the radio channels, a Doppler estimate for each channel, a frequency response of each radio channel, interference associated with each channel, or a quality of service requirement associated with the data stream.

BRIEF DESCRIPTION OF THE DRAWINGS

FIG. 6 is a diagram illustrating possible mappings between various MCSs and interleaving schemes;

DETAILED DESCRIPTION

In the following description, for purposes of explanation and non-limitation, specific details are set forth, such as particular nodes, functional entities, techniques, protocols, standards, etc. in order to provide an understanding of the described technology. It will apparent to one skilled in the art that other embodiments may be practiced apart from the specific details disclosed below. Although there is some discussion of application to a GSM/EDGE type system, the technology is applicable to any type of mobile radio communications system. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Figure 1:
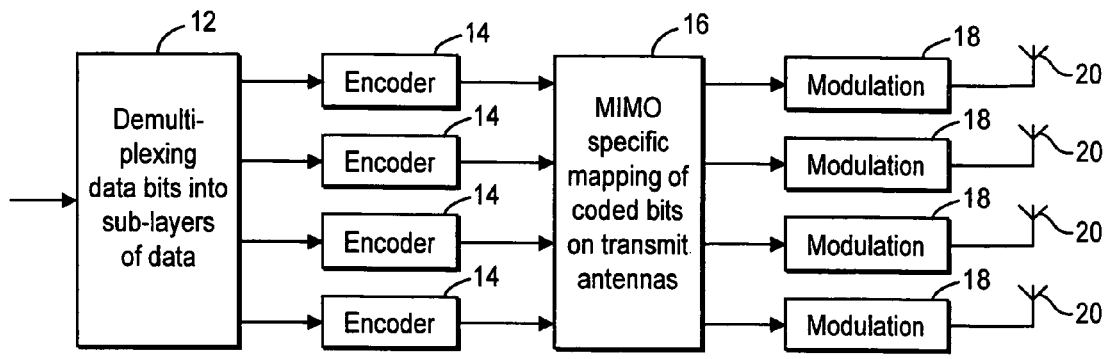
FIG. 1 illustrates a transmitting radio node for transmission with one MIMO configuration.
Figure 2:
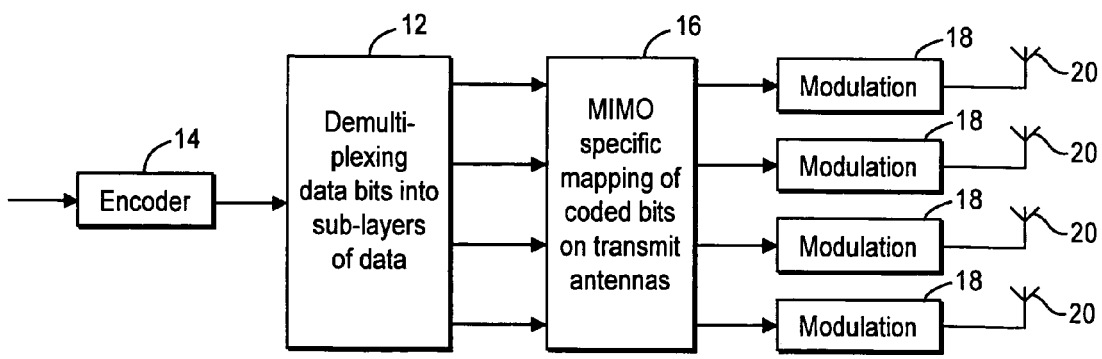
FIG. 2 is illustrates a transmitting radio node for transmission with another MIMO configuration.
Figure 3:
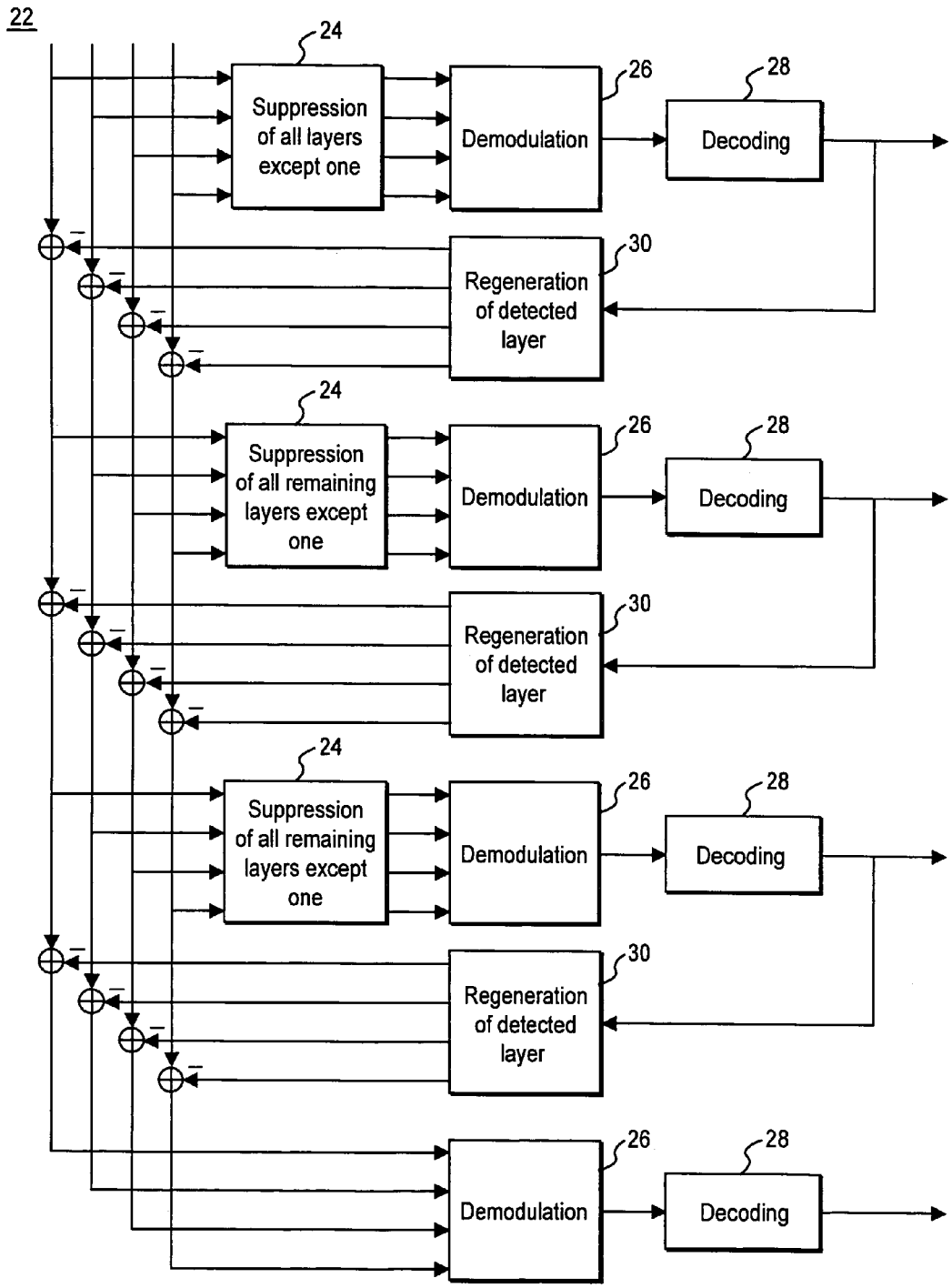
FIG. 3 illustrates a receiving radio node for receiving and decoding MIMO transmissions.
Figure 4:
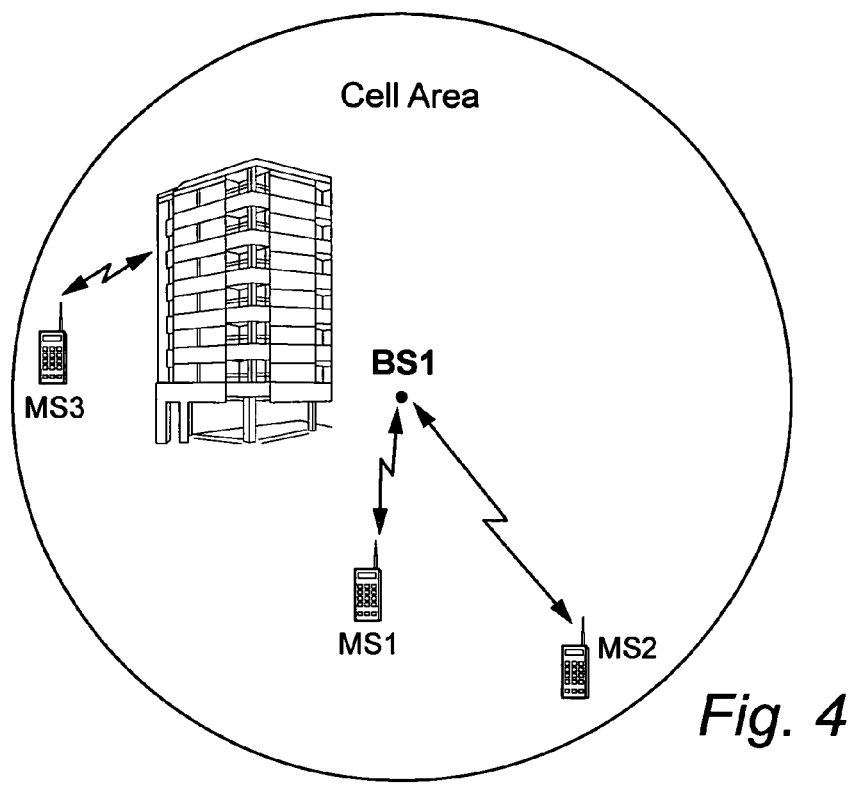
FIG. 4 illustrates a radio cell including a base station and several mobile stations likely to have different radio channels conditions.
Figure 5:
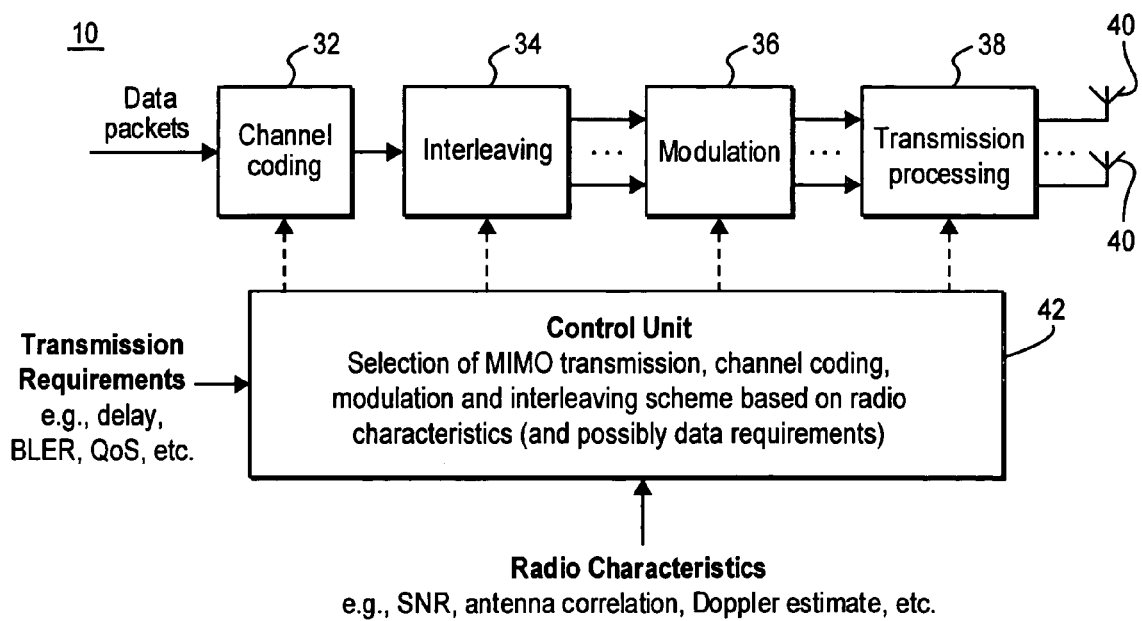
FIG. 5 is a function block diagram of an example embodiment that may be used in a radio node to control selection of coding rate, interleaving scheme, modulation scheme, and/or transmission scheme depending on determined radio characteristics in order to enhance performance depending on which coding rates and schemes are selected.

FIG. 5 is a function block diagram of an example embodiment that may be used in a radio node to control selection of a channel coding rate scheme, an interleaving scheme, and if desired, a modulation scheme and/or a transmission scheme depending on detected radio characteristics in order to enhance performance depending on which rates and schemes are selected. Although the technology allows for extensive flexibility in scheme selection, it will be understood that there does not need to be a selection of modulation or transmission scheme if a fixed modulation or transmission scheme is acceptable.

Data packets for transmission are received in a channel coder 32. A control unit 42 including processing circuitry and memory receives or determines one or more radio characteristics for the mobile station connection and determines an appropriate channel coding rate for the data packets based on the one or more radio characteristics and/or transmission requirements. To simplify, the general term radio characteristics encompasses transmission requirements. The one or more radio characteristics may include one or more of the following: a channel quality parameter for each radio channel, a measure of time variance of each radio channel, a measure of correlation between the radio channels, a Doppler estimate associated with each radio channel, a frequency response of each radio channel, delay profile associated with each radio channel, interference associated with each radio channel, block error rate (BLER) or the like, or a quality of service requirement associated with the data stream.

The time variance measure and Doppler estimate may be used to determine a time-diversity condition. The correlation measure between radio channels may be used to determine a space-diversity condition. The frequency response and delay profile may be used to determine a frequency-diversity condition. The channel quality and interference measures may be used to determine a general quality condition. Since interference may vary in time and in frequency, one or more interference measures capturing such variations can also be used for determining time and frequency diversity conditions. Other transmission requirements such as block error rate (BLER) targets, delay requirements, maximum number of transmission attempts, quality of service parameters, etc., will primarily affect the choice of channel coding, modulation, and transmission scheme.

The control 42 sends the selected coding rate to the channel coder 32 for implementation to produce coded blocks, each code block including multiple data units. The control unit 42 also determines an optimal interleaving scheme for the transmission based on the one or more radio characteristics and the selected coding scheme. Non-limiting example interleaving schemes include: time interleaving, space interleaving, frequency interleaving, and code interleaving. Other interleaving schemes could be used. The control unit 42 sends the selected interleaving scheme to the interleaving unit 34 which receives the code blocks from the channel coder 32 and performs the selected interleaving on the code block data units. Interleaving examples are described later in conjunction with FIGS. 9-11.

The radio characteristic information may be obtained or determined in any suitable manner. For example, the transmitter can itself determine information about the one or more radio characteristics, and based thereon, the transmitter performs the scheme selection. The receiver can determine the one or more radio characteristics and sends that information to the transmitter which makes the selections. Alternatively, the receiver can make the scheme selection(s) and send selection decisions or recommendations to the transmitter to implement. As another alternative, the transmitter makes a decision based on a combination of its own measurements and measurements or selections made by the receiver.

The control unit 42 also preferably (but not necessarily) determines a modulation scheme and/or a transmission processing scheme, e.g., a MIMO scheme, for the data packets based on the one or more radio characteristics. Non-limiting, example modulation schemes include GMSK and 8-ary PSK as described above for GSM/EDGE, but others could be used. Non-limiting, example transmission schemes include a 1-to-1 data layer/stream-to-antenna scheme, a power weighting scheme, e.g., allocate more transmission power to an antenna having a better signal quality, a MIMO scheme like DBLAST or VBLAST, transmission with different beam forming techniques, etc. The control unit 42 sends the selected modulation scheme to the modulator 36, which modulates the interleaved data units. The control unit 42 sends the selected transmission scheme to the transmission processing circuitry 38 which transmits the modulated data units over one or more antennas 40 using the selected transmission scheme.

The control unit memory includes one or more programs for implementing its control functions, and in an example, non-limiting embodiment, a lookup table having a mapping between one of the channel coding schemes and one of the multi-dimensional interleaving schemes associated with a particular radio characteristic or set of radio characteristics. The selecting step includes using the determined one or more radio channel characteristics to access from the lookup table the associated channel coding scheme and multi-dimensional interleaving scheme. Scheme selection may occur independently, but is preferably performed jointly or dependently. Joint selection means that the selection of one scheme takes the selection of one or more other schemes into account. In other example implementations, the lookup table stores modulation schemes and/or transmission schemes for a particular combination of coding and interleaving based on the one or more radio characteristics.

It may be desirable to only permit certain coding, interleaving, and/or other scheme combinations. FIG. 6 shows three different tables with different allowed MCS-interleaving combinations for use in a GSM/EDGE context. Consider a system with a set of MCSs: {MCS-1, MCS-2, . . . , MCS-9} land a set of interleaving schemes {I1, I2, I3}. In the first table, the transmitter may choose freely between all combinations of MCS and interleaving schemes. In the other two tables, the transmitter is constrained to different subsets of MCSs and interleaving schemes. In addition, each MCS may be mapped just to a single interleaving scheme. For instance, one interleaving scheme could be used for MCSs with low code rate channel coding and another interleaving scheme for the high code rate MCSs. This last approach may be useful in certain commercial implementations in view of the complexity if a large number of different combinations is allowed. Indeed, for a GSM/EDGE system, it may be desirable to consider a fixed mapping between interleaving scheme and MCS, i.e., for a given MCS only one interleaving scheme is available for use.

In GSM, the EGPRS radio link control (RLC) blocks are transmitted in several bursts which are separated in time. This feature coupled with frequency hopping means that channel variations between different bursts in the RLC block can be large, i.e., large diversity (low correlation) in the time domain. A good strategy for link adaptation is to increase or maximize diversity for MCSs with low code rates and reduce or minimize diversity for high code rate MCSs. In other words, an interleaving scheme is selected that reduces or minimizes the variation in quality between different parts of the RLC block for the high code rate MCS's. Another interleaving scheme is selected to increase or maximize the variation in signal quality for low rate MCS's. Small variations in signal quality may be achieved by transmitting over as few bursts as possible whereas large variations may be achieved by transmitting the RLC block over several bursts. In this EGPRS example, it may also be desirable to map specific transmission schemes with a particular coding and interleaving scheme. For example, interleaving in time is suitable for MIMO transmission using low to medium code rate MCS's, and interleaving across antennas is suitable for MIMO transmissions using high code rate MCS's (MCS-4, MCS-8 and MCS-9).

Figures 7, 8:
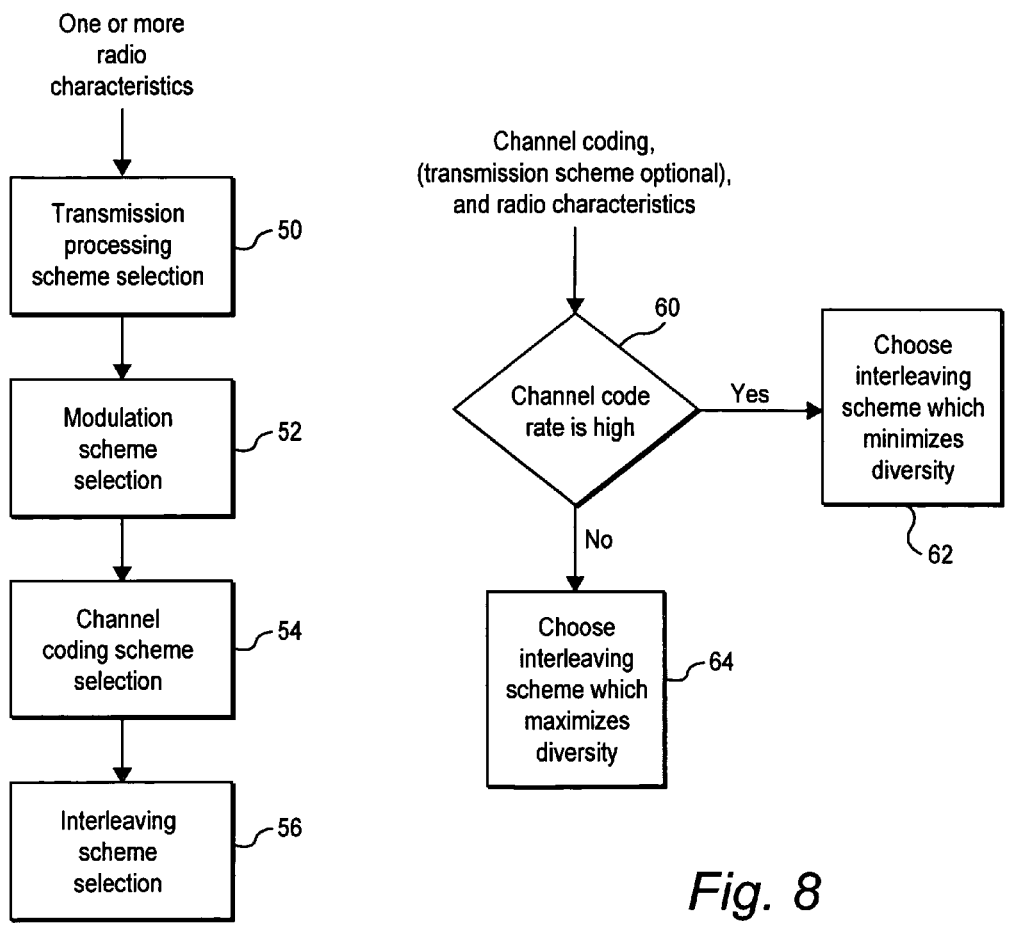
FIG. 7 is a flow chart illustrating example procedures for selecting one or more of the following schemes: transmission scheme, channel coding scheme, modulation scheme, and interleaving scheme based on one or more radio characteristics.
FIG. 8 a flow chart illustrating example interleaving or diversity scheme selection based on a particular channel coding rate and one or more radio characteristics.

FIG. 7 is a flow chart that illustrates example steps that may be carried out to determine optimal combinations of channel coding scheme, multi-dimensional interleaving scheme, modulation scheme, and/or transmission processing scheme. Optimal is used here in the sense that some performance criterion or criteria is/are improved. One example performance criterion is throughput over the radio interface, in which case scheme selection is made to improve throughput. First, one or more radio characteristics is determined followed by scheme selection. Step 50 indicates transmission processing scheme selection. Step 52 indicates modulation scheme selection. Step 54 indicates channel coding scheme selection. Step 56 indicates interleaving scheme selection. All of the selections are based on the determined one or more radio characteristics for the transmission and preferably also on one or more earlier scheme selections. As explained previously, not all of the scheme selections are required.

Various rules or algorithms may be used to make the scheme selections based on the radio characteristics and already selected schemes. FIG. 8 is one example shown in flow chart form. In this example, a channel coding scheme and transmission scheme (in this case a MIMO scheme) have already been selected. Given those selections and the radio characteristics, a decision is made at step 60 whether the selected channel coding rate is higher, meaning that the data packets have been coded with smaller amount of redundancy. If so, an interleaving scheme is selected that reduces or even minimizes diversity in step 62. If not, an interleaving scheme is selected that increases or maximizes diversity in step 64.

The reason for this is that for low rate codes, i.e., a large amount of redundancy, channel variations improve decoder performance. For high rate codes, i.e., a small amount of redundancy, channel variations degrade the decoder performance.

Consider the following further example scenarios. For a higher quality radio channel characteristic, a higher rate channel coding, and a lower diversity condition between radio channels across the multiple antennas, a multi-dimensional interleaving scheme that interleaves the data units for one block over the multiple antennas for space-diversity transmission may be selected. For a higher quality radio channel characteristic, higher rate channel coding, and lower diversity condition between radio channels over time, a multi-dimensional interleaving scheme that interleaves data units for a first block over one of the multiple antennas for time-diversity transmission for the first block and data units for a second block over another of the multiple antennas for time-diversity transmission for the second block may be selected.

For a lower quality radio channel characteristic, lower rate channel coding, and lower diversity condition between radio channels across the multiple antennas, a multi-dimensional interleaving scheme that interleaves for a first block over one of the multiple antennas for time-diversity transmission for the first block and data units for a second block over another of the multiple antennas for time-diversity transmission for the second block may be selected. For a lower quality radio channel characteristic, lower rate channel coding, and lower diversity condition between radio channels over time, a multi-dimensional interleaving scheme that interleaves the data units for one block over the multiple antennas for space-diversity transmission may be selected.

Figure 9:
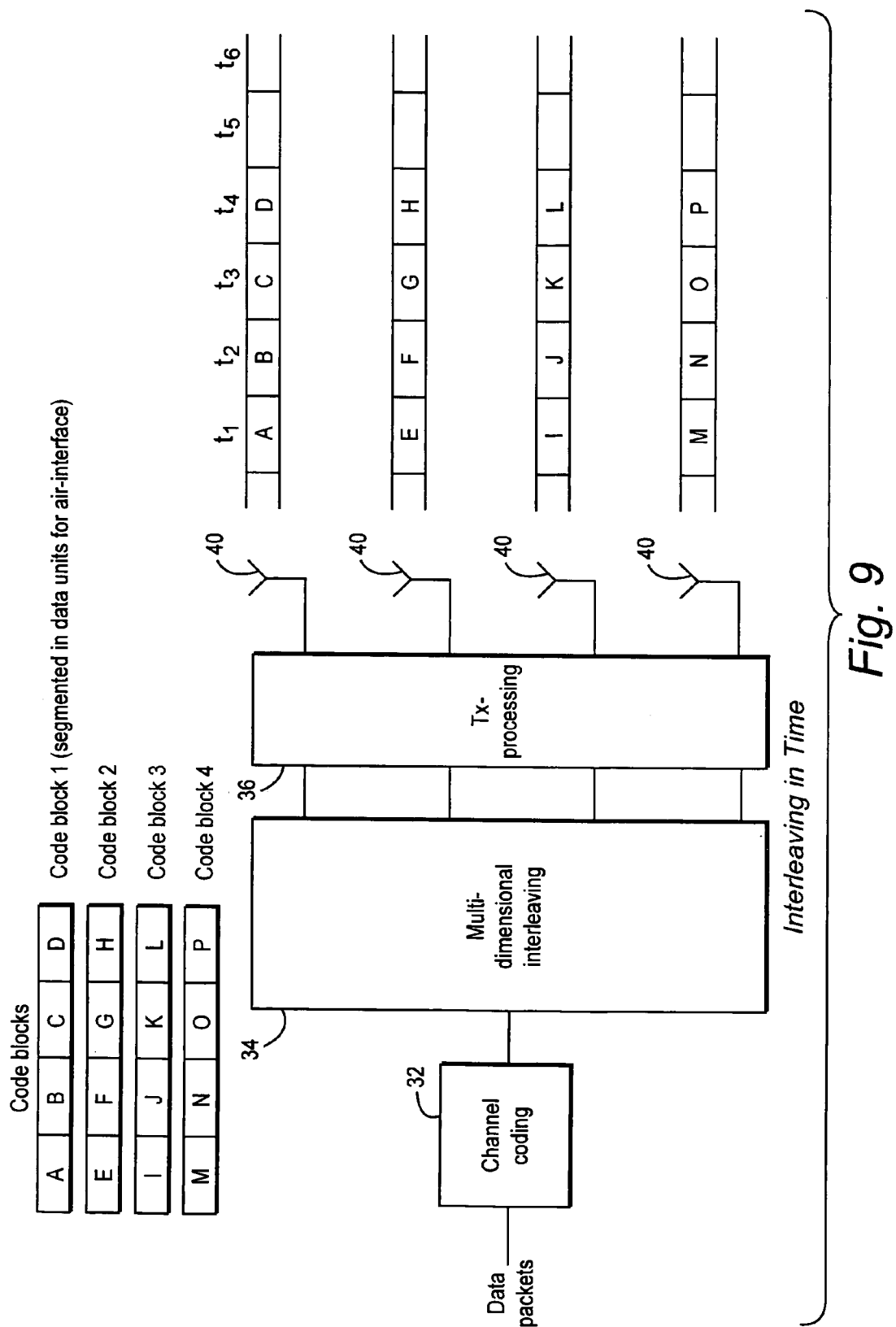
FIG. 9 is a diagram illustrating an example of interleaving in time.

FIG. 9 shows a time interleaving scheme example. There are four channel coded blocks 1, 2, 3, and 4 provided by the channel coder 32 to the multi-dimensional interleaver 34. Each coded block includes four data units that can be interleaved if desired. For example, coded block 1 includes data units A, B, C, and D. The interleaver 34 interleaves the data units over time with the first antenna 40 transmitting data units A, B, C, and D during successive time intervals $t_1$-$t_4$. The interleaver 34 interleaves coded block 2 so the data units E, F, G, and H are transmitted via the second antenna 40 during successive time intervals $t_1$-$t_4$. The interleaver 34 interleaves coded block 3 so the data units I, J, K, and L are transmitted via the third antenna 40 during successive time intervals $t_1$-$t_4$. The interleaver 34 interleaves coded block 4 so the data units M, N, O, and P are transmitted via the fourth antenna 40 during successive time intervals $t_1$-$t_4$.

Figure 10:
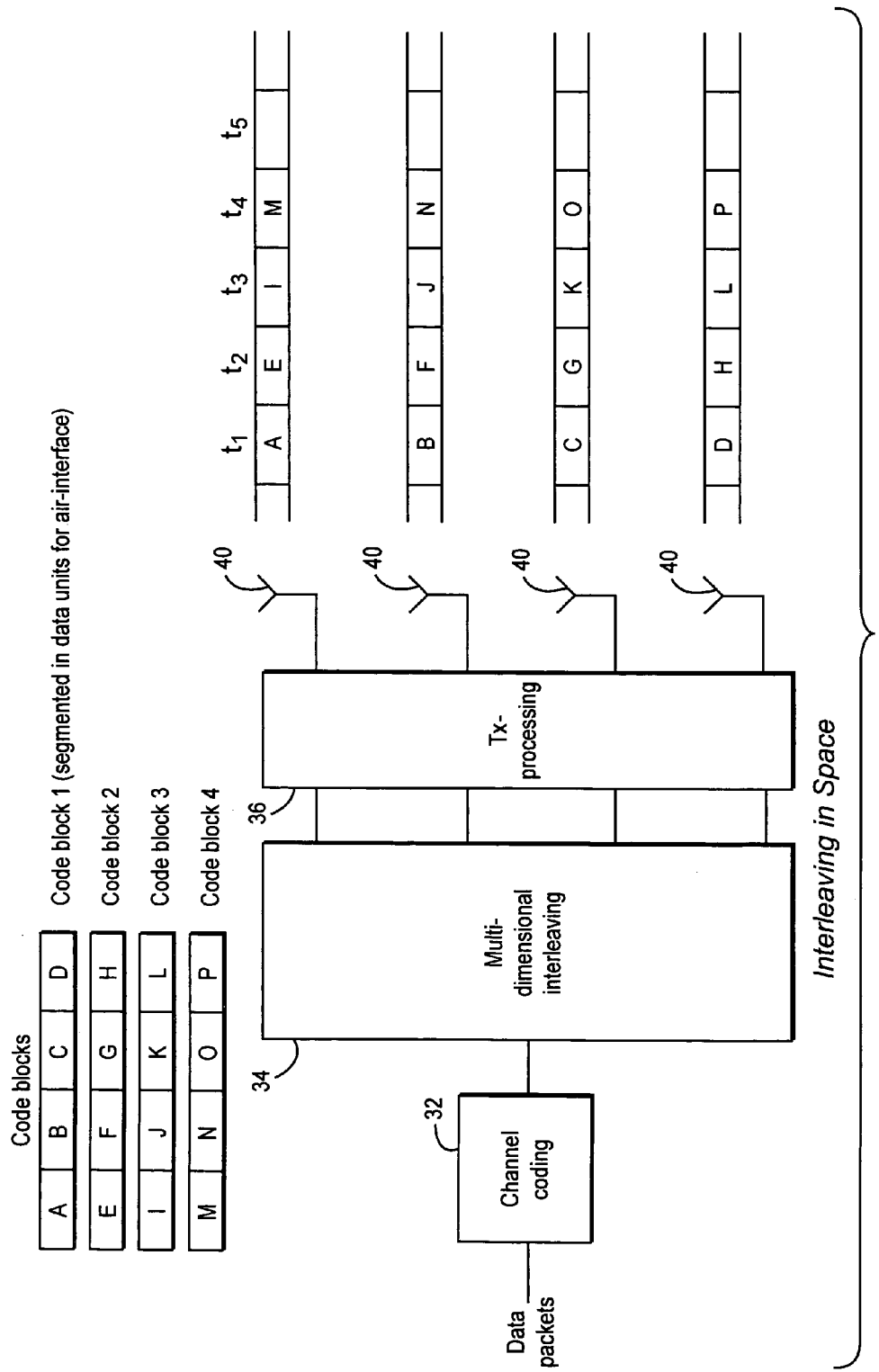
FIG. 10 is a diagram illustrating an example of interleaving in space.

FIG. 10 shows a space interleaving scheme example. The four channel coded blocks 1, 2, 3, and 4 are provided by the channel coder 32 to the multi-dimensional interleaver 34. The interleaver 34 interleaves the data units from one block over space, i.e., to different antennas during the same time interval. So the four antennas 40 each transmit a corresponding data unit A, B, C, and D during time interval $t_1$. The interleaver 34 interleaves coded block 2 so that each data unit E, F, G, and H is transmitted from a corresponding one of the four antennas 40 during time interval $t_2$. The interleaver 34 interleaves coded block 3 so that each data unit I, J, K, and L is transmitted from a corresponding one of the four antennas 40 during time interval $t_3$. The interleaver 34 interleaves coded block 4 so that each data unit M, N, O, and P is transmitted from a corresponding one of the four antennas 40 during time interval $t_4$.

Figure 11:
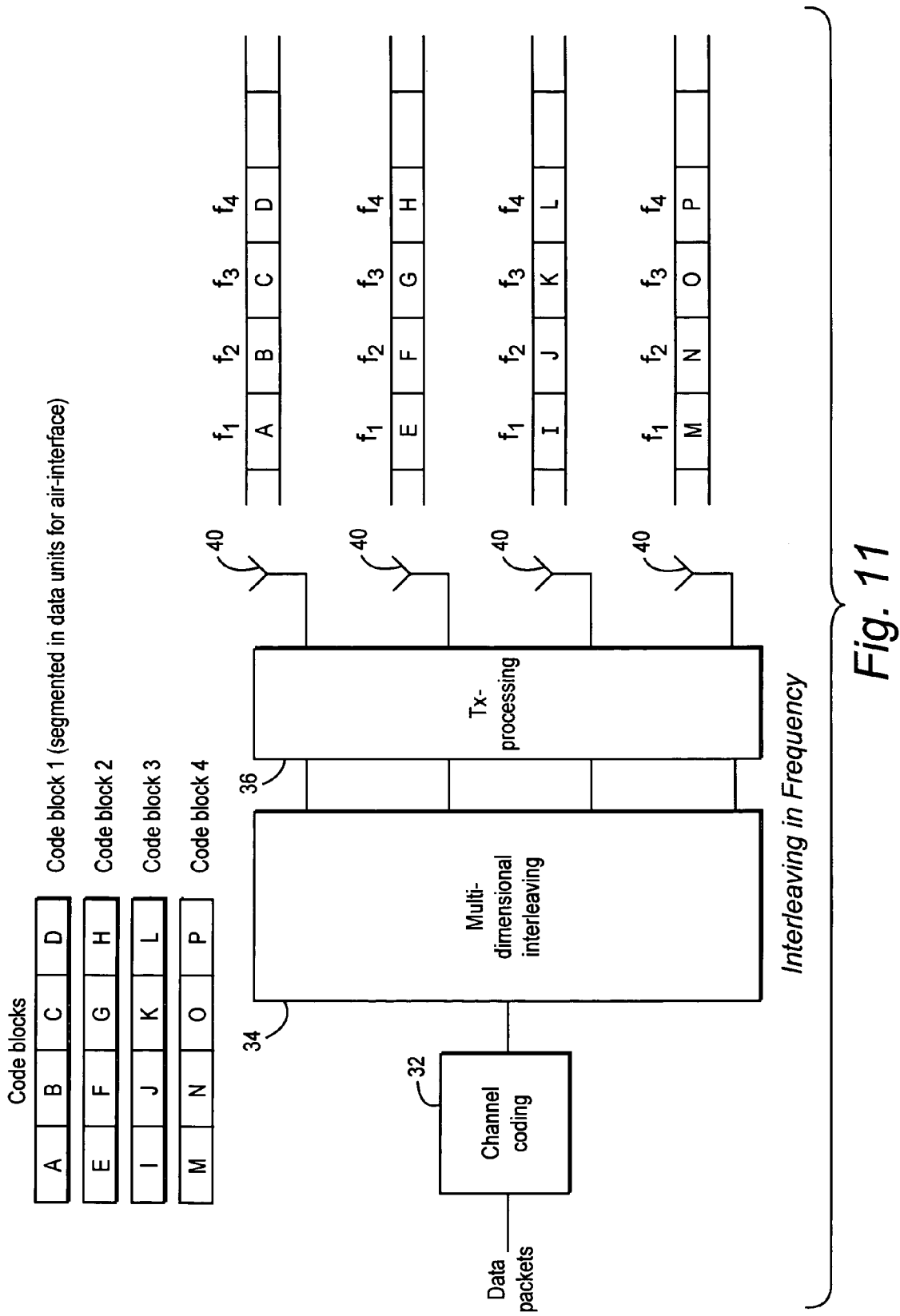
FIG. 11 is a diagram illustrating an example of interleaving in frequency.

FIG. 11 shows a frequency interleaving scheme example that may be appropriate in an orthogonal frequency division multiplexing (OFDM) transmission scheme or any other frequency division multiplexed system. The four channel coded blocks 1, 2, 3, and 4 are provided by the channel coder 32 to the multi-dimensional interleaver 34. The interleaver 34 interleaves the data units from one block over frequency, e.g., to different frequencies $f_1$-$f_4$, during either the same or different time intervals.

In the example, non-limiting embodiments above, simple cases have been illustrated, where the coded data is interleaved in one dimension only. However, each interleaving scheme may include interleaving in one or more dimensions for each code block. For example, the data units in FIG. 10 can have interleaving in time within each data unit A, B, C, and D, even though the different data units within a code block are interleaved over the different antennas. As another example in an OFDM system, a first interleaving scheme may include interleaving over space and frequency, a second interleaving scheme only interleaves the code block over frequency, a third interleaving scheme interleaves over frequency and time, and a fourth interleaving scheme interleaves over space, frequency, and time. Selection of the interleaving scheme depends on the coding scheme and the diversity conditions in time, space, and frequency.

It is beneficial to adapt the modulation and channel coding scheme based on the channel quality. It is also beneficial to adapt between different transmission schemes such as one-antenna transmission, space-time coding, beam forming, and MIMO. But to get good performance in various situations and for multiple channel coding schemes, it is important to take into account the diversity in different dimensions, e.g., time, space and frequency. Accounting for diversity in different dimensions is accomplished by adapting the interleaving scheme based on the diversity conditions in different dimensions and based on the channel coding rate. For example, with high rate codes, an interleaving scheme that minimizes the diversity may be chosen, whereas with low rate codes, an interleaving scheme that maximizes the diversity may be chosen.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

What is claimed is:

1. A method for communicating blocks of data over a radio interface using multiple antennas, each antenna being associated with at least one corresponding radio channel and each data block including multiple data units, comprising:

determining one or more characteristics of the radio channels associated with the multiple antennas;

determining one or more diversity conditions of the radio channels based on one or more of the radio channel characteristics;

based on the determined one or more radio channel characteristics, selecting one of plural channel coding schemes to code a data block;

coding the data block using the selected channel coding scheme;

based on the determined one or more diversity conditions, selecting one of plural multi-dimensional interleaving schemes; and allocating data units from the coded block over one or more of the multiple transmit antennas using the selected multi-dimensional interleaving scheme; and wherein the selected channel coding scheme and interleaving scheme are selected to optimize a performance of the data block transmission for the determined one or more radio channel characteristics and the one or more diversity conditions, wherein for a higher quality radio channel characteristic, a higher rate channel coding, and a lower diversity condition between radio channels across the multiple antennas, selecting a multi-dimensional interleaving scheme that interleaves the data units for one block over the multiple antennas for space-diversity transmission.

2. The method in claim 1, wherein the one or more diversity conditions include one or more of time diversity, space diversity, or frequency diversity of or between the radio channels.

3. The method claim 1, wherein the selected channel coding scheme is selected to optimize the performance of the data block transmission given the determined one or more radio channel characteristics, and wherein the multi-dimensional interleaving scheme is selected based on the diversity condition of each of the radio channels and a channel coding rate of the selected coding scheme.

4. The method of claim 1, wherein the selection of channel coding scheme and multi-dimensional interleaving is made jointly based on the radio channel characteristics to optimize the performance of the data block transmission.

5. The method in claim 1, wherein the selected channel coding scheme and multi-dimensional interleaving scheme are selected based on which transmission scheme will be used during a next transmission time interval.

6. The method in claim 1, further comprising:
based on the determined one or more radio channel characteristics, selecting one of plural transmission schemes.

7. The method in claim 6, wherein the selection of transmission scheme depends on the selected channel coding scheme and the determined one or more radio channel characteristics.

8. The method in claim 6, wherein at least one transmission scheme is a multiple input multiple output (MIMO) transmission scheme.

9. The method in claim 6, wherein the transmission scheme, channel coding scheme, and multi-dimensional interleaving scheme are selected in parallel.

10. The method in claim 1, further comprising:
providing a memory with a lookup table that stores a mapping between one of the channel coding schemes and one of the multi-dimensional interleaving schemes associated with a particular radio characteristic or set of radio characteristics, wherein the selecting step includes using the determined one or more radio channel characteristics to access from the lookup table the associated channel coding scheme and multi-dimensional interleaving scheme.

11. The method in claim 1, further comprising:
based on the determined one or more radio channel characteristics, selecting one of plural modulation schemes for modulating the data stream.

12. The method in claim 1, wherein the diversity condition includes a time diversity that would be obtained by interleaving the data units over time.

13. The method in claim 1, wherein the diversity condition includes a space diversity that would be obtained by interleaving the data units across the multiple antennas.

14. The method in claim 1, wherein the diversity condition includes a frequency diversity that would be obtained by interleaving the data units over frequency.

15. The method in claim 1, further comprising:
for a higher quality radio channel characteristic, higher rate channel coding, and lower diversity condition between radio channels over time, selecting a multi-dimensional interleaving scheme that interleaves data units for a first block over one of the multiple antennas for time-diversity transmission for the first block and data units for a second block over another of the multiple antennas for time-diversity transmission for the second block.

16. The method in claim 1, further comprising:
for a lower quality radio channel characteristic, lower rate channel coding, and lower diversity condition between radio channels across the multiple antennas, selecting a multi-dimensional interleaving scheme that interleaves for a first block over one of the multiple antennas for time-diversity transmission for the first block and data units for a second block over another of the multiple antennas for time-diversity transmission for the second block.

17. The method in claim 1, further comprising:
for a lower quality radio channel characteristic, lower rate channel coding, and lower diversity condition between radio channels over time, selecting a multi-dimensional interleaving scheme that interleaves the data units for one block over the multiple antennas for space-diversity transmission.

18. The method in claim 1, wherein the performance includes throughput over the radio interface, and wherein the one or more radio characteristics includes one or more of the following: a channel quality parameter, a measure of time variance of each radio channel, a measure of correlation between the radio channels, a frequency response of each radio channel, delay profile of each radio channel, interference, block error rate (BLER), a delay requirement associated with the data stream, or a quality of service requirement associated with the data stream.

19. The method in claim 1, further comprising:
receiving information about the one or more radio channel characteristics at a transmitter, and
the transmitter performing the selections.

20. The method in claim 1, wherein the one or more radio channel characteristics is determined at a receiver communicating with a transmitter over the radio interface, wherein the receiver performs the selections and communicates the selections to the transmitter, which implements the selections made by the receiver, or wherein the transmitter makes the selections based on the selections provided by the receiver.

21. The method in claim 1, wherein a transmitter performs the selections based on a combination of one or more measurements made by the transmitter and one or more measurements or selections made by a receiver communicating with the transmitter over the radio interface.

22. A radio node for communicating blocks of data over a radio interface, comprising:
radio circuitry;
multiple antennas coupled to the radio circuitry, each antenna being associated with at least one corresponding radio channel and each data block including multiple data units; and
processing circuitry configured to:
determine one or more characteristics of the radio channels associated with the multiple antennas;

determine one or more diversity conditions of the radio channels;

based on the determined one or more radio channel characteristics, select one of plural channel coding schemes to code a data block;

based on the determined one or more diversity conditions, select one of plural multi-dimensional interleaving schemes to allocate data units from the coded block over one or more of the multiple transmit antennas, wherein the processing circuitry is configured to select the channel coding scheme and the interleaving scheme to optimize a performance of the data block transmission for the determined one or more radio channel characteristics and the determined one or more diversity conditions, wherein for a higher quality radio channel characteristic, a higher rate channel coding, and a lower diversity condition between radio channels across the multiple antennas, the processing circuitry is configured to select a multi-dimensional interleaving scheme that interleaves the data units for one block over the multiple antennas for space-diversity transmissions.

23. The radio node in claim 22, wherein the one or more diversity conditions include one or more of time diversity, space diversity, or frequency diversity of or between the radio channels.

24. The radio node claim 22, wherein the processing circuitry is configured to select the channel coding scheme to optimize the performance of the data block transmission given the determined one or more radio channel characteristics, and wherein the processing circuitry is configured to select the multi-dimensional interleaving scheme based on the diversity condition of each of the radio channels and a channel coding rate of the selected coding scheme.

25. The radio node claim 22, wherein the processing circuitry is configured to select the channel coding scheme and the multi-dimensional interleaving jointly based on the radio channel characteristics to optimize the performance of the data block transmission.

26. The radio node in claim 22, wherein the processing circuitry is further configured to select the channel coding scheme and multi-dimensional interleaving scheme based on which transmission scheme will be used during a next transmission time interval.

27. The radio node in claim 22, wherein the processing circuitry is further configured, based on the determined one or more radio channel characteristics, to select one of plural transmission schemes.

28. The radio node in claim 27, wherein the selection of transmission scheme depends on the selected channel coding scheme and the determined one or more radio channel characteristics.

29. The radio node in claim 27, wherein at least one transmission scheme is a multiple input multiple output (MIMO) transmission scheme.

30. The radio node in claim 27, wherein the transmission scheme, channel coding scheme, and multi-dimensional interleaving scheme are selected jointly.

31. The radio node in claim 22, further comprising:

a memory with a lookup table for storing a mapping between one of the channel coding schemes and one of the multi-dimensional interleaving schemes associated with a particular radio characteristic or set of radio characteristics, wherein the processing circuitry is configured to access from the lookup table the associated channel coding scheme and multi-dimensional interleaving scheme using the determined one or more radio channel characteristics.

32. The radio node in claim 22, wherein the processing circuitry is configured to select one of plural modulation schemes for modulating the data stream based on the determined one or more radio channel characteristics.

33. The radio node in claim 22, wherein the diversity condition includes a time diversity that would be obtained by interleaving the data units over time.

34. The radio node in claim 22, wherein the diversity condition includes a space diversity that would be obtained by interleaving the data units across the multiple antennas.

35. The radio node in claim 22, wherein the diversity condition includes a frequency diversity that would be obtained by interleaving the data units over frequency.

36. The radio node in claim 22, wherein for a lower quality radio channel characteristic, lower rate channel coding, and lower diversity condition between radio channels across the multiple antennas, the processing circuitry is configured to select a multi-dimensional interleaving scheme that interleaves for a first block over one of the multiple antennas for time-diversity transmission for the first block and data units for a second block over another of the multiple antennas for time-diversity transmission for the second block.

37. The radio node in claim 22, wherein for a lower quality radio channel characteristic, lower rate channel coding, and lower diversity condition between radio channels over time, the processing circuitry is configured to select a multi-dimensional interleaving scheme that interleaves the data units for one block over the multiple antennas for space-diversity transmission.

38. The radio node in claim 22, wherein the performance includes throughput over the radio interface, and wherein the one or more radio characteristics includes one or more of the following: a channel quality parameter, a measure of time variance of each radio channel, a measure of correlation between the radio channels, a frequency response of each radio channel, delay profile of the radio channel, interference, block error rate, a maximum delay requirement, or a quality of service requirement associated with the data stream.

39. The radio node in claim 22, wherein the radio node is a base station.

40. The radio node in claim 22, wherein the radio node is a mobile station.

41. The radio node in claim 22, wherein at least one radio channel characteristic is measured in the radio node.

42. The radio node in claim 23, wherein the radio node is a transmitter radio node and includes:

transmitter circuitry associated with each of the multiple antennas, a channel coder for coding the data block using the selected channel coding schemes, and an interleaver for allocating, the data units of the coded data block over one or more of the multiple transmit antennas in accordance with the selected multi-dimensional interleaving scheme, the processing circuitry is configured to receive measurements from another receiver node and make one or more determinations or one or more selections based on the received measurements.

43. The radio node in claim 42, wherein the processing circuitry is configured to receive and implement one or more selections from the other receiver node.

44. A radio node for communicating blocks of data over a radio interface, comprising:

radio circuitry;

multiple antennas coupled to the radio circuitry, each antenna being associated with at least one corresponding radio channel and each data block including multiple data units; and processing circuitry configured to:

determine one or more characteristics of the radio channels associated with the multiple antennas;

determine one or more diversity conditions of the radio channels;

based on the determined one or more radio channel characteristics, select one of plural channel coding schemes to code a data block;

based on the determined one or more diversity conditions, select one of plural multi-dimensional interleaving schemes to allocate data units from the coded block over one or more of the multiple transmit antennas, wherein the processing circuitry is configured to select the channel coding scheme and the interleaving scheme to optimize a performance of the data block transmission for the determined one or more radio channel characteristics and the determined one or more diversity conditions, wherein for a higher quality radio channel characteristic, higher rate channel coding, and lower diversity condition between radio channels over time, the processing circuitry is configured to select a multi-dimensional interleaving scheme that interleaves data units for a first block over one of the multiple antennas for time-diversity transmission for the first block and data units for a second block over another of the multiple antennas for time-diversity transmission for the second block.

* * * * *